US007964851B2

(12) United States Patent
Fehrenbacher

(10) Patent No.: US 7,964,851 B2
(45) Date of Patent: Jun. 21, 2011

(54) METHOD FOR THE SPECTROMETRIC PHOTON DOSIMETRY FOR X-RAY AND GAMMA RADIATION

(75) Inventor: Georg Fehrenbacher, Muehltal (DE)

(73) Assignee: GSI Helmholtzzentrum Fuer Schwerionenforschung GmbH, Darmstadt (DE)

( * ) Notice: Subject to any disclaimer, the term of this patent is extended or adjusted under 35 U.S.C. 154(b) by 304 days.

(21) Appl. No.: 11/917,081

(22) PCT Filed: Apr. 26, 2006

(86) PCT No.: PCT/EP2006/003862
§ 371 (c)(1),
(2), (4) Date: Jul. 10, 2008

(87) PCT Pub. No.: WO2006/131172
PCT Pub. Date: Dec. 14, 2006

(65) Prior Publication Data
US 2009/0127468 A1    May 21, 2009

(30) Foreign Application Priority Data

Jun. 10, 2005  (DE) .......................... 10 2005 026 795

(51) Int. Cl.
*G01T 1/02* (2006.01)
(52) U.S. Cl. ................................. 250/370.07
(58) Field of Classification Search ............. 250/370.07
See application file for complete search history.

(56) References Cited

U.S. PATENT DOCUMENTS

| 3,646,347 | A |   | 2/1972 | Farmer et al. |
|-----------|---|---|--------|---------------|
| 4,217,496 | A | * | 8/1980 | Daniels et al. ............... 250/369 |
| 4,217,497 | A | * | 8/1980 | Daniels et al. ............... 250/369 |

(Continued)

OTHER PUBLICATIONS

Georg Fehrenbacher et al., "Unfolding the response of a Ge detector used for in-situ gamma-ray spectrometry", Nuclear Instuments and Methods in Physics Reasearch, Section—A: Accelerators, Spectrometers, Detectors and Associated Equipment, Elsevier, Amsterdam, NL, vol. 383, no. 2, Dec. 11, 1996, pp. 454-462, XP0004016209.

(Continued)

*Primary Examiner* — David P Porta
*Assistant Examiner* — Djura Malevic
(74) *Attorney, Agent, or Firm* — Leydig, Voit & Mayer, Ltd.

(57) ABSTRACT

A method of spectrometric photon dosimetry for integrally and nuclide-specifically determining a gamma dose rate for X-ray and gamma radiation. The method includes measuring a spectrum in at least one energy group or at least one interval group. The pulse height distribution is with a spectrometer and a pulse height analyzer. The number of channels of the spectrometer is such that a map of the pulse height distribution at a requisite resolution over an energy can be made. The measured pulse height distribution is converted into a photon spectrum using a deconvolution procedure that uses response functions having the same energy resolution as the pulse height distribution. The dose spectrum is calculated using dose conversion factors that are energy-dependent and related to the mean energy of a respective corresponding energy interval. The integral dose or dose rate is determined by summing the dose spectrum. The spectrometer is switched to a low-resolution mode of operation in order to ascertain an integral dose rate and switched to a high-resolution mode of operation in order to analyze radiation sources for which nuclides that cause higher dose rates are to be identified.

19 Claims, 4 Drawing Sheets

U.S. PATENT DOCUMENTS

| | | | | |
|---|---|---|---|---|
| 4,536,841 | A | * | 8/1985 | Waechter et al. ........ 250/370.05 |
| 5,340,990 | A | * | 8/1994 | Brackenbush et al. ....... 250/395 |
| 5,406,086 | A | * | 4/1995 | Barthe et al. ............. 250/390.03 |
| 5,572,028 | A | * | 11/1996 | Moscovitch et al. ......... 250/337 |
| 6,423,972 | B1 | * | 7/2002 | Fehrenbacher et al. . 250/370.05 |
| 7,208,743 | B2 | * | 4/2007 | Luszik-Bhadra et al. ........................ 250/390.03 |
| 7,430,481 | B2 | * | 9/2008 | Mott ............................... 702/40 |
| 2004/0195517 | A1 | * | 10/2004 | Rowland et al. ......... 250/370.15 |
| 2007/0108379 | A1 | * | 5/2007 | Rowland et al. .............. 250/260 |

OTHER PUBLICATIONS

A. Pangratz at al., "Analyse der Aktivierung von Beschleunigerstrukturen und der damit verbundenen moeglichen Strahlenexposition durch Gammastrahlung", Praxis des Strahlenschutzes: Messen, Modelieren, Dokumentieren: 34. Jahrestagung des Fachverbandes fuer Strahlenschutz e.V., Kloster Seeon, Apr. 21-25, 2002, Jan. 2002, pp. 485-492, XP008066074.

"Strahlenschutzverordnung" [Online], Jun. 18, 2002, pp. 112-114, XP002388310, Retrieved from the Internet: URL: http://www.rp-giessen.de/me_in/medien/strahlenschutz/strlschv_18062002.pdf>, [retrieved on Jul. 3, 2006].

A. Clouvas et al., "Monte Carlo based method for conversion of in-situ gamma ray spectra obtained with a portable Ge detector to an incident photon flux energy distribution", Health Physics, vol. 74, No. 2, 1998, pp. 216-230, XP0008066085.

International Search Report, International Application No. PCT/EP2006/003862, European Patent Office mailed on Jul. 7, 2006.

* cited by examiner

METHOD FOR THE SPECTROMETRIC PHOTON DOSIMETRY FOR X-RAY AND GAMMA RADIATION

CROSS REFERENCE TO RELATED APPLICATIONS

This is a U.S. National Phase application under 35 U.S.C. §371 of International Application No. PCT/EP2006/003862, filed on Apr. 26, 2006, and claims the benefit of German Patent Application No. 10 2005 026 795.5, filed on Jun. 10, 2005. The International Application was published in German on Dec. 14, 2006 as WO 2006/131172 A1 under PCT Article 221(2).

FIELD OF THE INVENTION

The invention relates to a method for the spectrometric photon dosimetry for X-ray and gamma radiation within the keV to MeV range for purposes of determining the gamma dose rate integrally as well as nuclide-specifically.

BACKGROUND

Measuring systems for determining the gamma dose rate in routine operation can be based essentially on purely counting systems that employ a calibration factor to convert the counting rate into a dose rate. The technical challenge faced by manufacturers of measuring instruments is to adapt the energy- and angle-dependence of the measuring system to the measured parameter to be mapped, and to do so in such a way that this measured parameter can be described as precisely as possible by optimizing the arrangement of the active components and of the passive absorbers. The introduction of spectrometric systems such as, for instance, NaI or high-resolution Ge detectors, has opened up new possibilities for determining the gamma dose rate. Ascertaining photon spectra entails advantages during the analysis of radiation fields. For instance, it is relatively easy to determine several dose parameters such as, for example, the ambient equivalent dose or, assuming the radiation geometries PA (parallel from the back), AP (parallel from the front), ISO (uniformly from everywhere), LAT (laterally), ROT (rotating), etc., also organ doses or the effective dose.

Up until now, commercially available spectrometric detection systems have only employed approximation methods in order to ascertain the photon spectrum and the dose spectrum. The distributions measured using a detector and a multichannel analyzer are only approximately real photon spectra and they have to be corrected with respect to the events in which only partial-energy deposits of the incident photons occur. In the case of high-resolution detectors, there are deconvolution methods with which photon spectra can be ascertained from measured pulse height distributions at a high energy resolution.

The dose spectrum can be ascertained on the basis of the photon spectrum by using dose conversion factors and the integral dose can be determined by summing up the dose spectrum. The deconvolution method uses detector-specific response functions that can be computed, for instance, with Monte Carlo programs. The energy resolution of the response functions corresponds at best to that of the detector, but in actual practice, it is approximately five to ten times the energy resolution of the detector. The deconvolution method is based on a matrix inversion. The examples cited in the literature are realized for a wide energy range up to approximately 2 MeV or 3 MeV; therefore, it is necessary to work with a large matrix and numerous operations for the matrix inversion.

This method calls for a great deal of memory space and takes up CPU time in order to ascertain the photon spectra. If the method is repeated frequently, the use of resources, that is to say, the computation capabilities and energy consumption, is needlessly high which, in the case of smaller integrated measuring instruments, translates into increased time consumption and memory requirements.

A method for nuclide-specific exposure estimation was described in a presentation of the GSI [Gesellschaft für Schwerionenforschung mbH—Institute for Heavy Ion Research] on spectrometric photon dosimetry on Apr. 26, 2005. The local dose is measured in accordance with Article 39 of the German Radiation-Protection Ordinance [Strahlenschutzverordnung—StrlSchV]. The measuring of the local dose is carried out to augment or replace the determination of the personal dose according to Article 41 of StrlSchV. The method consists of employing a detector, HPGe or NaI, for example, to measure the pulse height distribution $M_i$. With a Monte Carlo program, for instance, EGS4, the response function is calculated, e.g. isotropically or in parallel, as a function of the geometry, yielding the response matrix $R_{ij}$. On this basis, the energy distribution of the photons, the photon spectrum $\Phi_j$, is determined via the mapping equation $$M_i = \Sigma R_{ij} \Phi_j.$$

In this context, a summation is carried out of j=1 to $n_{max}$. (In the mapping equation, $M_i$ is the measured distribution.) In the next step, the organ doses or the effective dose are obtained from the energy distribution of the photons using conversion factors such as, for instance, the ambient equivalent dose H* (10). An example of response functions of the ambient radiation in a laboratory, the spectral kerma distribution (KERMA=kinetic energy released in matter), and the example of the activation on an accelerator, among others, are presented.

In 2002, G. Fehrenbacher et al. presented a paper titled "Analyse der Aktivierung von Beschleunigerstrukturen und der damit verbundenen möglichen Strahlungsexposition durch Gammastrahlung" [Analysis of the activation of accelerator structures and of the associated possible radiation exposure to gamma radiation]. This paper provides examples of gamma spectra that were measured at the beam hole of the heavy-ion synchrotron of the German Institute for Heavy Ion Research (Gesellschaft für Schwerionenforschung mbH—GSI) after a period of radiation with deuterium ions on structures with elevated radiation losses. On the basis of the pulse height distribution measured employing a portable HPGe detector, the spectral photon flux density and the dose spectrum were ascertained by means of deconvolution. The response functions needed for the deconvolution were determined with the EGS4 simulation program. The dose rates determined on the basis of the spectra are compared to the measured values obtained employing a Geiger-Müller counter. The fraction of unscattered radiation in the total dose rate is estimated on the basis of an example.

In Health Physics, February 1998, Vol. 74, No. 2, A. Clouvas et al. present the essay titled "Conversion of in-situ gamma ray spectra". The suggestion is made to convert an in-situ γ-ray spectrum into a photon flux energy distribution, the conversion being based on the Monte-Carlo method. The spectrum was measured with a portable Ge detector. The spectrum is first freed of the partial-absorption and cosmic-ray events so as to leave only the events that are associated with the full absorption of the gamma radiation. Based on the remaining spectrum, the efficiency curve of the full-energy deposits of the detector, ascertained by means of calibrated point sources and Monte-Carlo simulations, is employed and the photon flux energy distribution is then derived. The events that have to do with the particle absorption in the detector are calculated by means of the Monte-Carlo simulation for various incident photon energies and angles.

The deconvolution method, which has not yet become common practice in the technical world, would be too laborious and resource-consuming for the mere determination of the dose rate if the work is carried out at full resolution of the detector with the full number of channels of the multichannel analyzer. For routine cases, where there is no need for radio-nuclide association, the computation and memory requirements invested are needlessly high.

Up until now, there are only instruments that are used exclusively as spectrometers and whose software component was developed separately for the above-mentioned method.

SUMMARY

An aspect of the present invention is to work with measured pulse height distributions whose energy resolution is adapted to the envisaged measuring task.

In an embodiment, the invention provides method of spectrometric photon dosimetry for integrally and nuclide-specifically determining a gamma dose rate for X-ray and gamma radiation. The method includes measuring a spectrum in at least one energy group or at least one interval group. The pulse height distribution is measured with a spectrometer and a pulse height analyzer. The number of channels of the spectrometer is such that a map of the pulse height distribution at a requisite resolution over an energy can be made. The measured pulse height distribution is converted into a photon spectrum using a deconvolution procedure that uses response functions having the same energy resolution as the pulse height distribution. The dose spectrum is calculated using dose conversion factors that are energy-dependent and each related to a mean energy of a respective corresponding energy interval. The integral dose or dose rate is determined by summing the dose spectrum. The spectrometer is switched to a low-resolution mode of operation in order to ascertain an integral dose rate and switched to a high-resolution mode of operation in order to analyze radiation sources for which nuclides that cause higher dose rates are to be identified.

BRIEF DESCRIPTION OF THE DRAWINGS

The method of the present invention will be described in detail in the following with reference to exemplary embodiments and accompanying drawings, in which.

Figure 1:
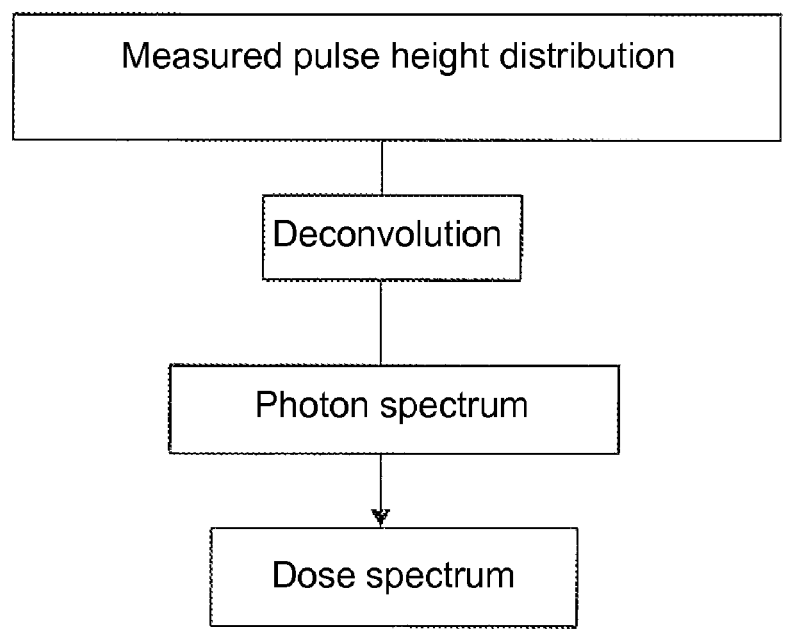
FIG. 1 shows an aspect of the invention including the determination of photon and dose spectra.

In an embodiment of the present invention, the spectrum is measured in at least one energy group or at least one interval group, without losing dosimetric information and also so as to save computer resources.

The pulse height distribution is measured with a spectrometer and a pulse height analyzer, whereby the spectrometer has such a number of channels that the spectrum is mapped at the requisite resolution over the entire energy range by means of the pulse height distribution. The channels are equidistant from each other for the high-resolution spectrometer. This allows the association of the dose fractions to individual radionuclides in the subsequent analysis method.

In the deconvolution step, the measured pulse height distribution is converted into a photon spectrum by means of a deconvolution procedure, a matrix inversion, for which purpose the deconvolution procedure uses response functions that have the same energy resolution as the pulse height distribution.

The photon spectrum:
The dose spectrum is calculated using dose conversion factors. The energy-dependent dose conversion factors are each related to the mean energy of the corresponding energy interval. By summing up the dose spectrum, the integral dose rate or dose is ascertained relative to the measuring-time interval, and thus the dose rate is determined. At a high dose rate, the active measuring time is reduced by switching off the data acquisition at equal time intervals and corrected again during the subsequent dose determination, whereby the duration of the time gaps is adapted to the level of the dose rate.

In order to ascertain the integral dose rate, the spectrometer is switched to the low-resolution mode of operation, which is often the standard setting of the spectrometer when the integral dose rate is in the foreground. The spectrometer is switched over to the high-resolution mode of operation in order to analyze the radiation sources for which nuclides have to be identified that cause elevated dose rates.

In an embodiment, the number of channels may be $2^{11}=2048$ for purposes of depicting the pulse height distribution at a sufficient resolution over the entire energy range. In this context, the channels for the high-resolution spectrometer typically lie apart from each other at equal distances of between 0.5 keV and 1 keV. This allows the dose fractions to be associated with individual radionuclides in the subsequent analysis method.

In order to prevent pile-up effects at very high dose rates, the active measuring time is reduced by switching off the data acquisition at equal time intervals and corrected again during the subsequent dose determination. The duration of the time gaps may be adapted to the level of the dose rate.

In addition to the ambient equivalent dose, the organ doses may be calculated using direction-specific conversion factors if the radiation geometries are known (AP, PA, LAT, ROT, isotropic, published in ICRP 74 (International Commission on Radiological Protection, Publication No. 74)).

The method according to an embodiment of the present invention is suitable for periodically structured dose rates with a minimal pulse length, whereby the processing time of the measuring instrument and the pulse period have to be coordinated with each other. Therefore, radiation sources that radiate continuously as well as those that are structured to radiate periodically can be measured.

The combined method selected here combines two types of spectrum processing.

The spectrometer may include two modes of operation:
a) high energy resolution and the possibility of employing the deconvolution method peak-specifically, that is to say, nuclide-specifically, and to relate the dose determination to the individual radionuclides;
b) operation of the spectrometer at a reduced energy resolution and with a smaller number of channels.

In case b), the energy resolution is adapted to the dose-conversion function in such a way that the dose is determined sufficiently accurately but the number of channels relative to the maximum physical energy resolution of the detector is considerably reduced, so that the method requires fewer resources and is executed much faster.

An aspect of the invention is the use of measured pulse height distributions whose energy resolution is adapted to the envisaged measuring task. In routine cases, dose rate measuring can be performed with sufficient precision but at a high measuring-repetition frequency. In the case of an expanded analysis, the work can be done with the best possible energy resolution and the possibility of associating the dose rate with the individual radionuclides. The choice between these two measuring modes allows improved measurements to be adapted to the measuring task in question.

In an embodiment, the method combines two requirements in one system:
a) operation at a better energy resolution and the possibility of associating the dose fractions with individual nuclides, and
b) the case in which the dose rate has to be ascertained quickly and sufficiently accurately at a high repetition rate.

In both cases, the possibility exists to determine various dose parameters or organ doses, which, up until now, was hardly or not at all possible with purely counting systems.

An aspect of the invention is depicted in FIG. 1, which shows the determination of photon and dose spectra which includes the following steps: measured pulse height distribution, mathematical deconvolution, the obtained photon spectrum and, as the result, the definitive dose spectrum. In an embodiment, the invention includes these steps alone, without additional steps.

Figure 2:
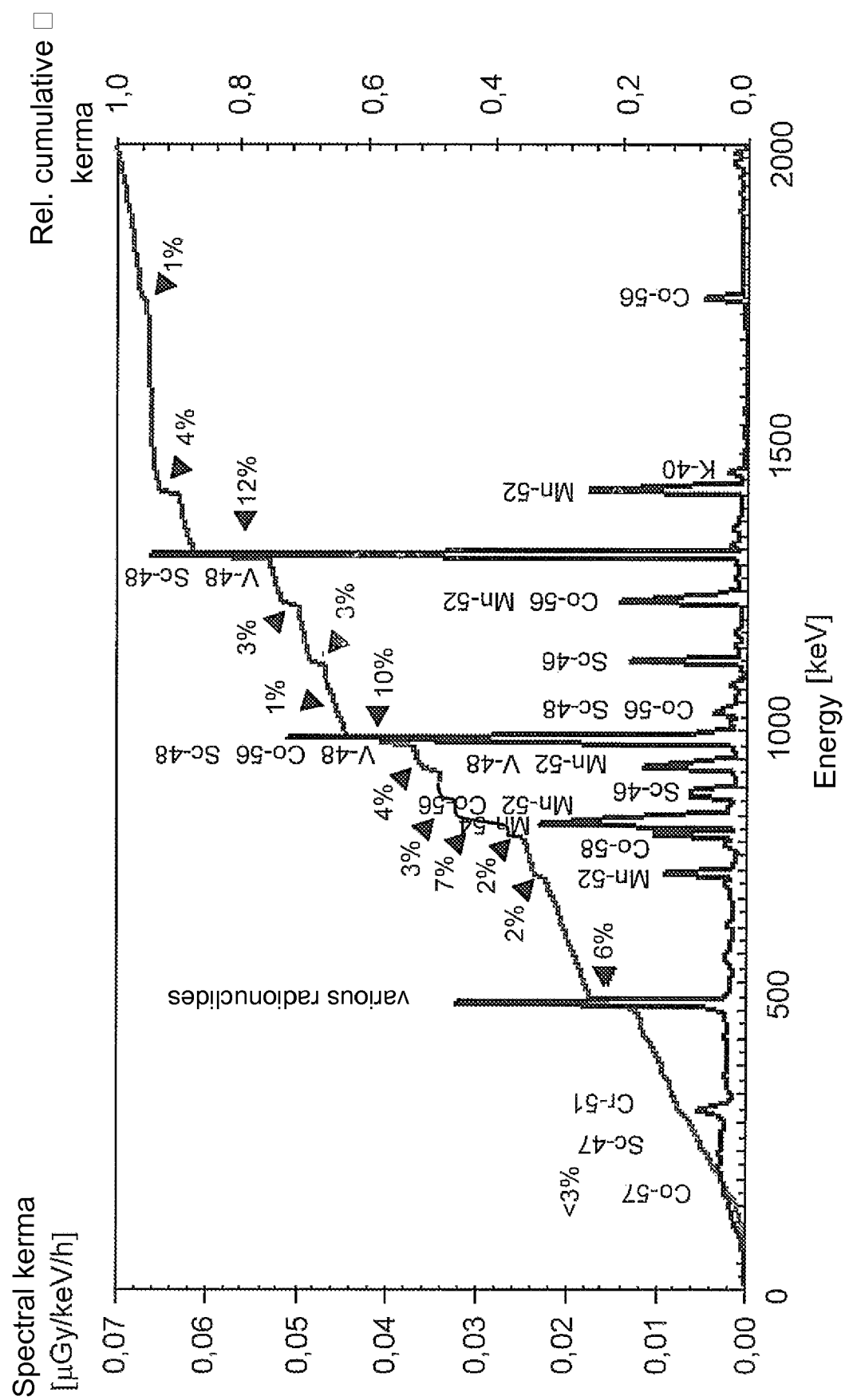
FIG. 2 shows the photon spectrum with the association of the dose rate.

FIG. 2 shows the calculated spectral and relative cumulative kerma as an example of the measurement. The radionuclides were identified on the basis of the energy lines and determined by means of the spectral kerma rates of the fraction per peak. As mentioned, the identified radionuclides are Co-56, Co-57, Co-58, Cr-51, V-48, Sc-47, Sc-48, Mn-52 and Mn-54. It can also be seen that about 60% of the measured dose rate results from primary, unscattered photon radiation and not from the scattered radiation. If the half-life times are known, the drop in the total dose rate can be estimated. FIG. 2 shows the photon spectrum with the association of the dose rate to the radionuclides as well as the cumulative dose function for the air-kerma as the measured parameter for a Ge detector. The energy resolution is 10 keV for the spectrum and the deconvolution method. The method was carried out in the higher resolution version (spectrum in 10 keV intervals) for a Ge detector, for example, on activated structures of the GSI accelerator. The photon spectrum was ascertained and the contributions of the individual radionuclides to the total dose were estimated. FIG. 2 depicts the result, showing the percentage of the individual peaks relative to the total dose. The cumulative dose was confirmed using an integral hand-held measuring instrument. The dose values here are related to the kerma as the measured parameter.

Likewise indicated are photon spectra that are shown in two energy resolutions. In the first case, the energy resolution is indicated to be 10 keV as in Example 1 shown in FIG. 2, while in the second case, the spectrum is indicated in 10 keV increments only for small energies up to 200 keV. For higher energies, the spectrum is only indicated in 100 keV increments. Such an energy distribution reduces the number of energy intervals from 200 to 40. The ascertained dose, see FIG. 3, differs in both cases by less than 1%, so that the method chosen here can be considered as being sufficiently precise.

Figure 3:
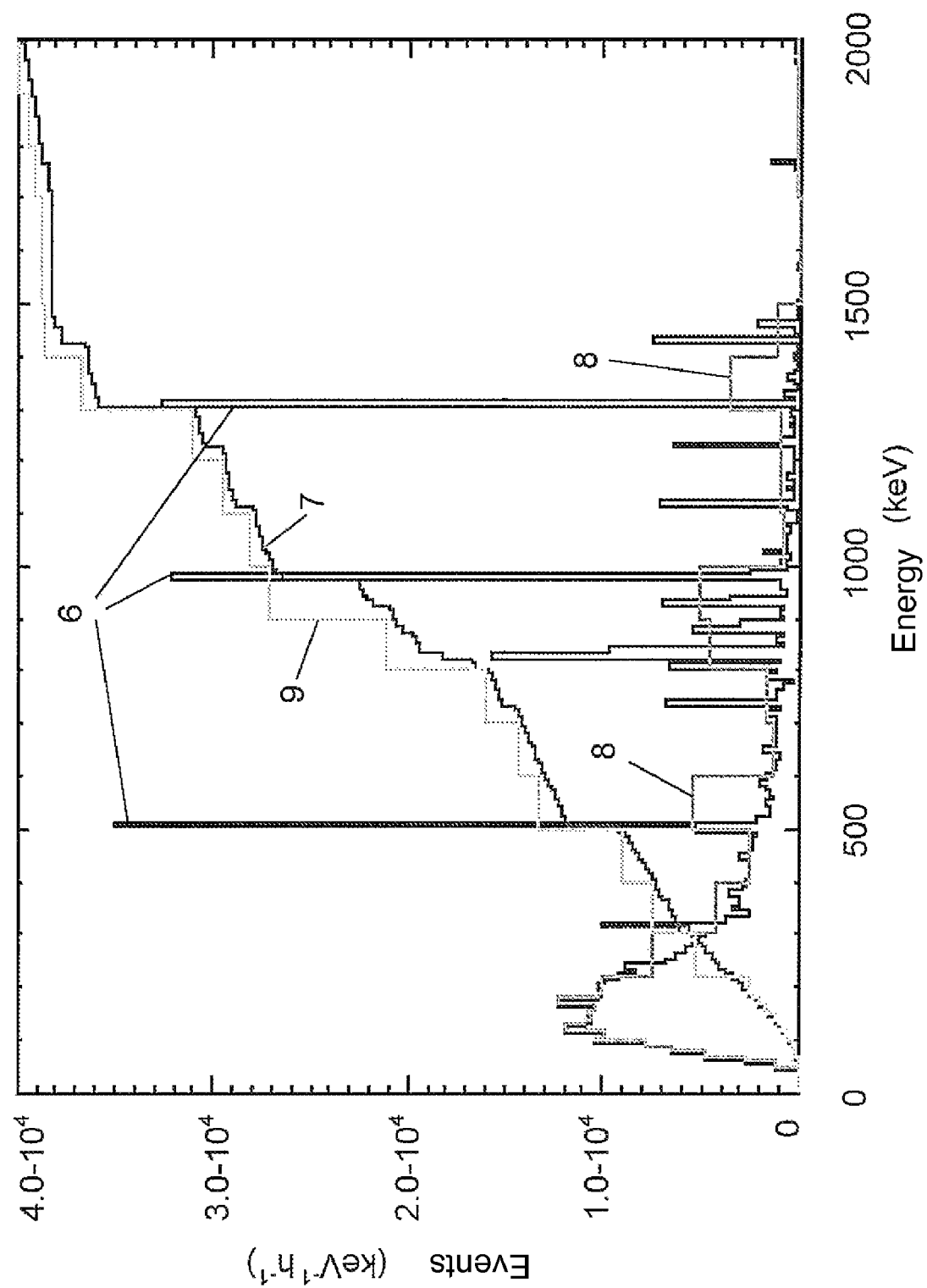
FIG. 3 shows the photon spectrum and the cumulative dose distribution.

FIG. 3 shows the photon spectrum 6 and cumulative dose distribution 7 for 10 keV resolution. The method was repeated for a coarser energy distribution 8, and the cumulative dose distribution 9 with the new energy distribution was calculated anew. The results shown are those with the photon spectrum in a 10 keV resolution 6, the appertaining cumulative dose 7, the spectrum in a coarser energy resolution 8 as well as the appertaining cumulative dose 9. The dose values here are related to the ambient equivalent dose H* (10) as the measured parameter.

Figure 4:
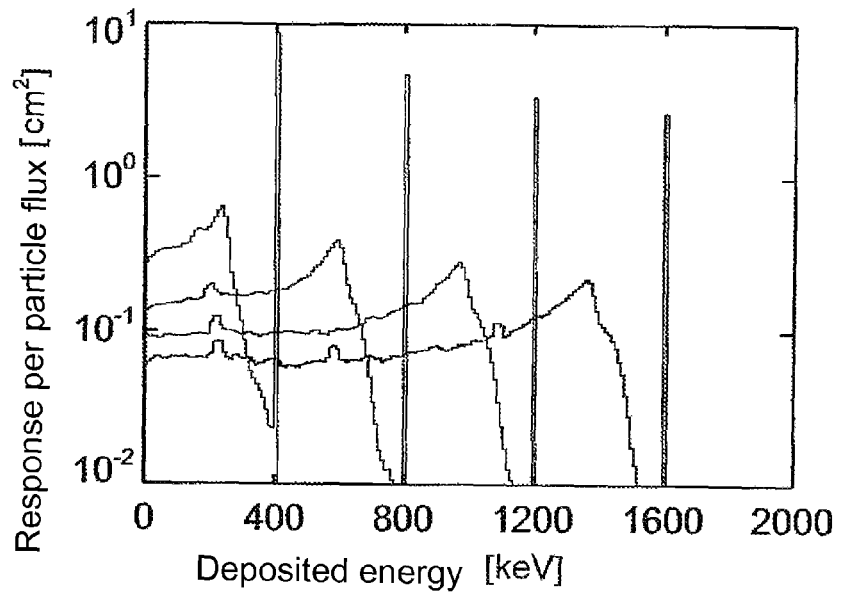
FIG. 4 shows response functions.
Figure 5:
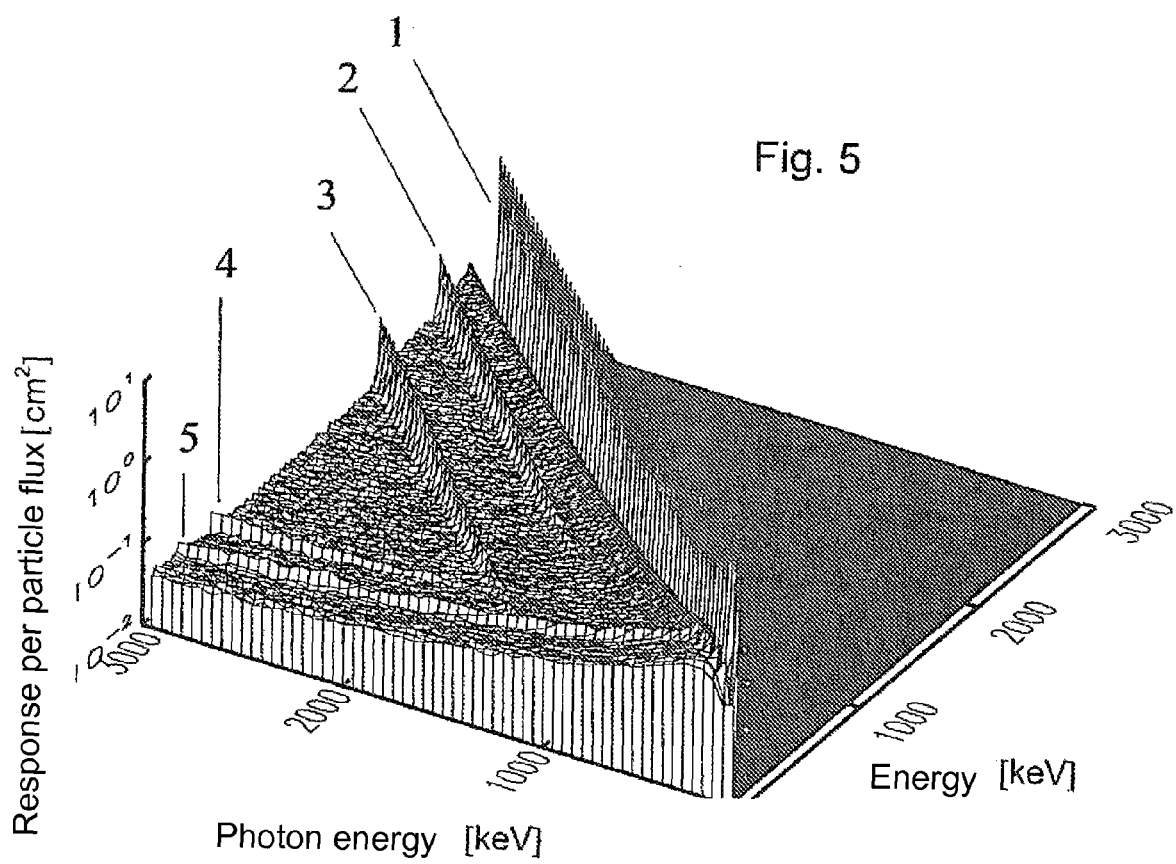
FIG. 5 shows the structure of the distribution.

FIG. 4 individually, and FIGS. 4 and 5 taken together, show the example of a response matrix. In FIG. 4, the response for the particle flux per $cm^2$ is plotted over the deposited energy in keV. The calculation of the response functions for photons having the energy levels of 400, 800, 1200 and 1600 keV are presented, namely, in the case of parallel radiation from the front. The response functions for photon radiation having the energy levels of 400, 800, 1200 and 1600 keV with the appertaining peaks, the full-energy deposits, can be seen at the appropriate places. In addition, the events with partial-energy deposits can be seen in the other curve belonging to a peak.

The structures of the distribution can be gleaned from FIG. 5, which, in a manner of speaking, is the depiction of the response matrix $R_{ij}$. FIG. 4 is a section of this. The diagonal elevation 1 shows the photon peak. Parallel to the left, this is followed by the structure of the single-escape peak 2, which drops towards lower energy levels, flattens out and ultimately disappears. The double-escape peak 3 that follows to the left has a very similar course. All of the response functions can be seen here next to each other as a matrix. The structure of the matrix reflects the physical processes that take place in the detector: full-energy deposit in peak 1. Starting at 1.022 MeV, photons are converted into positrons and electrons in pair-forming processes. Since the positrons, in turn, are annihilated into 2 gamma quanta, peaks can be found at the corresponding places. Peak 2, one annihilation quantum, peak 3, two annihilation quanta, escape from the detector. The peak of the generated annihilation quanta can be seen in peak 4. The backscatter peak of the gamma radiation that backscatters on the housing and is subsequently absorbed can be seen in peak 5.

The invention claimed is:

1. A method of spectrometric photon dosimetry for integrally and nuclide-specifically determining a gamma dose rate for X-ray and/or gamma radiation, comprising:
measuring a pulse height distribution with a first detector of a spectrometer and a pulse height analyzer, the spectrometer having a number of channels operable to map the pulse height distribution at a requisite resolution over an energy range, the spectrometer being set to a low-resolution mode of operation;
converting the measured pulse height distribution into a photon spectrum using a deconvolution procedure including a matrix inversion, the deconvolution procedure using response functions having a same energy resolution as the pulse height distribution;
calculating a dose spectrum using dose conversion factors, the dose conversion factors being energy-dependent and each related to a mean energy of a respective corresponding energy interval;
determining at least one of an integral dose and a dose rate by summing the dose spectrum;
operating the spectrometer in the high-resolution mode of operation with the first detector so as to measure a pulse height so as to analyze a radiation sources for which a nuclides that causes a high dose or dose rates is to be identified.

2. The method as recited in claim 1, wherein the radiation is in a range within keV to MeV.

3. The method as recited in claim 1, wherein the dose rate is the dose related to a measuring time interval.

4. The method as recited in claim 1, wherein the measuring the pulse height distribution is performed using 2048 channels.

5. The method as recited in claim 4, wherein the channels have an equal separation from each other of between 0.5 keV and 1 keV.

6. The method as recited in claim 4, further comprising, at a high dose rate, reducing an active measuring time by switching off data acquisition at equal time intervals and correcting the data acquisition during a subsequent dose determination, wherein a duration of a time gap is adapted to a level of the dose rate.

7. The method as recited in claim 6, further comprising calculating an ambient equivalent dose and an organ dose using a direction-specific conversion factor.

8. The method as recited in claim 1, wherein the dose rate is determined for a radiation source that radiates continuously.

9. The method as recited in claim 2, wherein the dose rate is determined for a radiation source that radiates continuously.

10. The method as recited in claim 4, wherein the dose rate is determined for a radiation source that radiates continuously.

11. The method as recited in claim 5, wherein the dose rate is determined for a radiation source that radiates continuously.

12. The method as recited in claim 6, wherein the dose rate is determined for a radiation source that radiates continuously.

13. The method as recited in claim 7, wherein the dose rate is determined for a radiation source that radiates continuously.

14. The method as recited in claim 1, wherein the dose rate is determined, for a radiation source that radiates periodically, based on a processing time of a measuring instrument and a pulse period of the radiation source so as to enable minimal pulse lengths to be measured.

15. The method as recited in claim 2, wherein the dose rate is determined, for a radiation source that radiates periodically, based on a processing time of a measuring instrument and a pulse period of the radiation source so as to enable minimal pulse lengths to be measured.

16. The method as recited in claim 4, wherein the dose rate is determined, for a radiation source that radiates periodically, based on a processing time of a measuring instrument and a pulse period of the radiation source so as to enable minimal pulse lengths to be measured.

17. The method as recited in claim 5, wherein the dose rate is determined, for a radiation source that radiates periodically, based on a processing time of a measuring instrument and a pulse period of the radiation source so as to enable minimal pulse lengths to be measured.

18. The method as recited in claim 6, wherein the dose rate is determined, for a radiation source that radiates periodically, based on a processing time of a measuring instrument and a pulse period of the radiation source so as to enable minimal pulse lengths to be measured.

19. The method as recited in claim 7, wherein the dose rate is determined, for a radiation source that radiates periodically, based on a processing time of a measuring instrument and a pulse period of the radiation source so as to enable minimal pulse lengths to be measured.

* * * * *